US 6,639,721 B2

United States Patent
Endo

(10) Patent No.: US 6,639,721 B2
(45) Date of Patent: Oct. 28, 2003

(54) ZOOM LENS SYSTEM AND OPTICAL APPARATUS USING THE SAME

(75) Inventor: Hiroshi Endo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/076,676

(22) Filed: Feb. 13, 2002

(65) Prior Publication Data

US 2002/0163736 A1 Nov. 7, 2002

(30) Foreign Application Priority Data

Feb. 19, 2001 (JP) ........................ 2001/041910

(51) Int. Cl.[7] .............................. G02B 27/44; G02B 5/18
(52) U.S. Cl. .................. 359/566; 359/676; 359/747; 359/686; 359/781; 396/72
(58) Field of Search ..................... 359/566, 676, 359/747, 686, 781; 396/72

(56) References Cited

U.S. PATENT DOCUMENTS

| 4,653,873 A | | 3/1987 | Kawamura ............... 350/427 |
|---|---|---|---|
| 4,759,617 A | * | 7/1988 | Tokumaru ................ 359/686 |
| 5,000,550 A | | 3/1991 | Takahashi et al. ........ 350/426 |
| 5,044,706 A | | 9/1991 | Chen ....................... 359/357 |
| 5,132,848 A | * | 7/1992 | Nishio .................... 359/686 |
| 5,268,790 A | | 12/1993 | Chen ....................... 359/558 |
| 5,329,401 A | | 7/1994 | Sato ........................ 359/686 |
| 5,576,890 A | | 11/1996 | Tanaka et al. ........... 359/686 |
| 5,748,384 A | * | 5/1998 | Sensui ..................... 359/686 |
| 5,786,942 A | * | 7/1998 | Komori .................... 359/686 |
| 5,790,321 A | | 8/1998 | Goto ........................ 359/742 |
| 6,384,985 B1 | * | 5/2002 | Hashimura ............... 359/686 |
| 2002/0080492 A1 | * | 6/2002 | Nakai ....................... 359/566 |

FOREIGN PATENT DOCUMENTS

| JP | 60-87312 | | 5/1985 |
|---|---|---|---|
| JP | 2/201310 | | 8/1990 |
| JP | 4-213421 | | 8/1992 |
| JP | 4-235515 | | 8/1992 |
| JP | 5-241073 | | 9/1993 |
| JP | 6-324262 | | 11/1994 |
| JP | 11-174328 | * | 7/1999 |
| JP | 11-174329 | * | 7/1999 |

* cited by examiner

Primary Examiner—Mark A. Robinson
Assistant Examiner—Leo Boutsikaris
(74) Attorney, Agent, or Firm—Morgan & Finnegan, LLP

(57) ABSTRACT

There are provided A zoom lens system comprising, in order from an object side, a first lens unit of negative refractive power, a second lens unit of positive refractive power, a third lens unit of negative refractive power, and a fourth lens unit of positive refractive power, wherein the zoom lens system zooming from a wide angle end to a telephoto end a separation between each lens units is varied so that conditional expressions D1W>D1T, D2W>D2T, and D3W>D3T are satisfied where DiW is a separation between an i-th lens unit and an (i+1)-th lens unit at a wide-angle end, DiT is a separation between an i-th lens unit and an (i+1)-th lens unit at a telephoto end, wherein a diffraction optical element is included in at least one of lens units.

14 Claims, 13 Drawing Sheets

ZOOM LENS SYSTEM AND OPTICAL APPARATUS USING THE SAME

BACKGROUND OF THE INVENTION

The present invention relates to zoom lens systems and optical apparatuses using the same, and more particularly a compact, high-performance and ultra wide-angle zoom lens system especially capable of satisfactorily correcting transverse chromatic aberration, and an optical apparatus using the same. The inventive zoom lens system and optical apparatus are suitable for still cameras, such as a single-lens reflex camera, electronic still cameras, and video cameras.

An interchangeable lens for use with a single-lens reflex camera requires a back focal distance long enough to secure a space to arrange a quick return mirror, etc. in a lens system at a side of an image surface. A digital camera using a CCD also requires a back focal distance long enough to secure a space to arrange a low-pass filter, an infrared light cutting filter, etc.

A negative lead type zoom lens system of negative refractive power has conventionally been known as a so-called ultra wide-angle lens which has a focal length shorter than 20 mm at an wide-angle end when converted for a 35 mm single-lens reflex camera.

For example, Japanese Laid-Open Patent Applications Nos. 60-87312, 2-201310, 5-241073, 4-235515, etc. propose zoom lens systems that have four lens units including, in order from an object side, a first unit of negative refractive power, a second unit of positive refractive power, a third unit of negative refractive power, and a fourth unit of positive refractive power, and that move at least two lens units among these lens units for zooming. The lens system has a retro-focus type as a zoom type, which may secure the above back focal distance with a simple lens unit structure. Such a simple lens structure type advantageously reduces the cost, but disadvantageously makes the miniaturization difficult since it has an increased stop diameter and large moving amount of each lens unit necessary for zooming in realizing high range zooming and large aperture arrangement.

A zoom lens system has been proposed in Japanese Lad-Open Patent Applications Nos. 11-174328 and 11-174329, which ameliorates these disadvantages and attempts to miniaturize the entire lens system as well as realizing high range zooming.

Each of these references arranges a zoom lens system including totally four lens units of, in order from an object side, negative refractive power, positive refractive power, negative refractive power, and positive refractive power, and achieves zooming by properly moving predetermined lens units.

The above conventional wide-angle zoom lens systems have had specific disadvantages in the way of satisfactorily correcting the distortion, curvature of field and transverse chromatic aberration to improve the good optical performance. They are generated because the lens system forms such an asymmetrical refractive power arrangement with respect to a stop as arranges the negative refractive power at the object side and the positive refractive power at the image side. In particular, the transverse chromatic aberration remains much between an intermediate image height and a maximum image height, causing color blurs when a bright, high intensity subject is shot. Use of anomalous dispersion glass is known as a method for correcting the transverse chromatic aberration, but the anomalous dispersion glass is expensive. In addition, it does not provide any remarkable effect on the miniaturization of the lens system.

In order to correct the chromatic aberration, in addition to a method using a combination of different dispersion glass materials, Japanese Laid-Open Patent Application Nos. 4-213421 and 6-324262 and U.S. Pat. No. 5,268,790 have propose an optical system that provides a lens surface or part of the optical system with a diffraction optical element having a diffraction effect to correct the chromatic aberration.

In general, enhanced refractive power of a lens unit or an increased moving amount of each zooming lens unit to realize a compact zoom lens system with high range zooming would increase aberration, in particular, chromatic aberration that fluctuates with zooming, whereby it becomes difficult to obtain good optical performance throughout the entire zoom range.

BRIEF SUMMARY OF THE INVENTION

Accordingly, it is an exemplary object of the present invention to provide a zoom lens system and optical apparatus using the same, which properly arranges a lens in each lens unit and a diffraction optical surface in the lens unit, thereby facilitating a high range zooming ratio, satisfactorily correcting the transverse chromatic aberration that fluctuates with zooming, and exhibiting good optical performance throughout the entire zoom range.

Another exemplary object of the present invention is to provide a compact zoom lens system having a focal length of about 28 mm when converted into a focal length for a 35 mm single-lens reflex camera, and an optical apparatus using the same, which have good optical performance, in particular in corrected transverse chromatic aberration.

A zoom lens system of one aspect of the present invention includes, in order from an object side, a first lens unit of negative refractive power, a second lens unit of positive refractive power, a third lens unit of negative refractive power, and a fourth lens unit of positive refractive power, the zoom lens system zooming from a wide-angle end to a telephoto end while varying a separation between respective lens units so that conditional expressions D1W>D1T, D2W<D2T, and D3W>D3T are satisfied where D1W is a separation between i-th and (i+1)-th lens units at a wide-angle end, DiT is a separation between the i-th and (i+1)-th lens units at a telephoto end, wherein a diffraction optical element is included in at least one of the lens units.

The diffraction optical element may be included in the fourth lens unit, and a conditional expression 15<f4DOE/ft<1500 may be satisfied where f4DOE is a focal length of only a diffraction component of the diffraction optical element, and ft is a focal length of an entire lens system at the telephoto end.

The diffraction optical element may be included in the first lens unit, and a conditional expression −1500<f1DOE/ft<−15 may be satisfied where f1DOE is a focal length of only a diffraction component of the diffraction optical element and ft is a focal length of an entire lens system at the telephoto end.

The diffraction optical element may be included in the first and fourth lens units, wherein conditional expressions 15<f4DOE/ft<1500 and −1500<f1DOE/ft<−15 may be satisfied where f1DOE is a focal length of only a diffraction component of the diffraction optical element included in the first lens unit, f4DOE is a focal length of only a diffraction component of the diffraction optical element included in the fourth lens unit, and ft is a focal length of an entire lens system at the telephoto end.

Conditional expressions $0.7<|f1|/\sqrt{fw \cdot ft}<1.1$, $0.6<f2/\sqrt{fw \cdot ft}<1.4$, $1.05<|f3|/f2<1.5$, and $1.05<f4/f2<2.5$ may be satisfied where fw and ft are focal lengths of an entire lens system at the wide-angle and telephoto ends, respectively, and fi is a focal length of the i-th lens unit.

Preferably, a conditional expression 1.6<SKw/fw<2.8 is satisfied where fw is a focal length of an entire lens system at the wide-angle end, and SKw is a back focal distance at the wide-angle end.

The first lens unit may have such an aspheric surface that negative refractive power of the aspheric surface decreases from a center of the lens to a peripheral of the lens.

The second and fourth lens units may move together during zooming.

The first lens unit may move while drawing a convex locus at a side of an image surface during zooming.

The above zoom lens system may further comprise a stop adjacent to the third lens unit at the object side or an image side.

The fourth lens unit may have such an aspheric surface that positive refractive power of the aspheric surface decreases from a center of the lens to a peripheral of the lens.

A conditional expression $-30<\theta<30$, more preferably, $-15<\theta<15$ may be satisfied where $\theta$ is an angle between a ray of light incident to and emitted from the diffraction optical element and a plane normal of the diffraction optical element.

The diffraction optical element may have a layered structure.

A conditional expression $|dQ(h)/dh|<30$ may be satisfied where Ci is a phase coefficient, h is a height from a center of an optical axis, $\lambda_o$ is a reference wave length, and $Q(h)=(C1 \cdot h^2+C2 \cdot h^4+C3 \cdot h^6+ \ldots )/\lambda_0$.

An optical apparatus of another aspect of the present invention includes one of the above zoom lens systems.

Other objects and further features of the present invention will become readily apparent from the following description of preferred embodiments with reference to accompanying drawings.

DETAILED DESCRIPTION OF THE PREFERRED EMBODIMENTS

Figure 1:
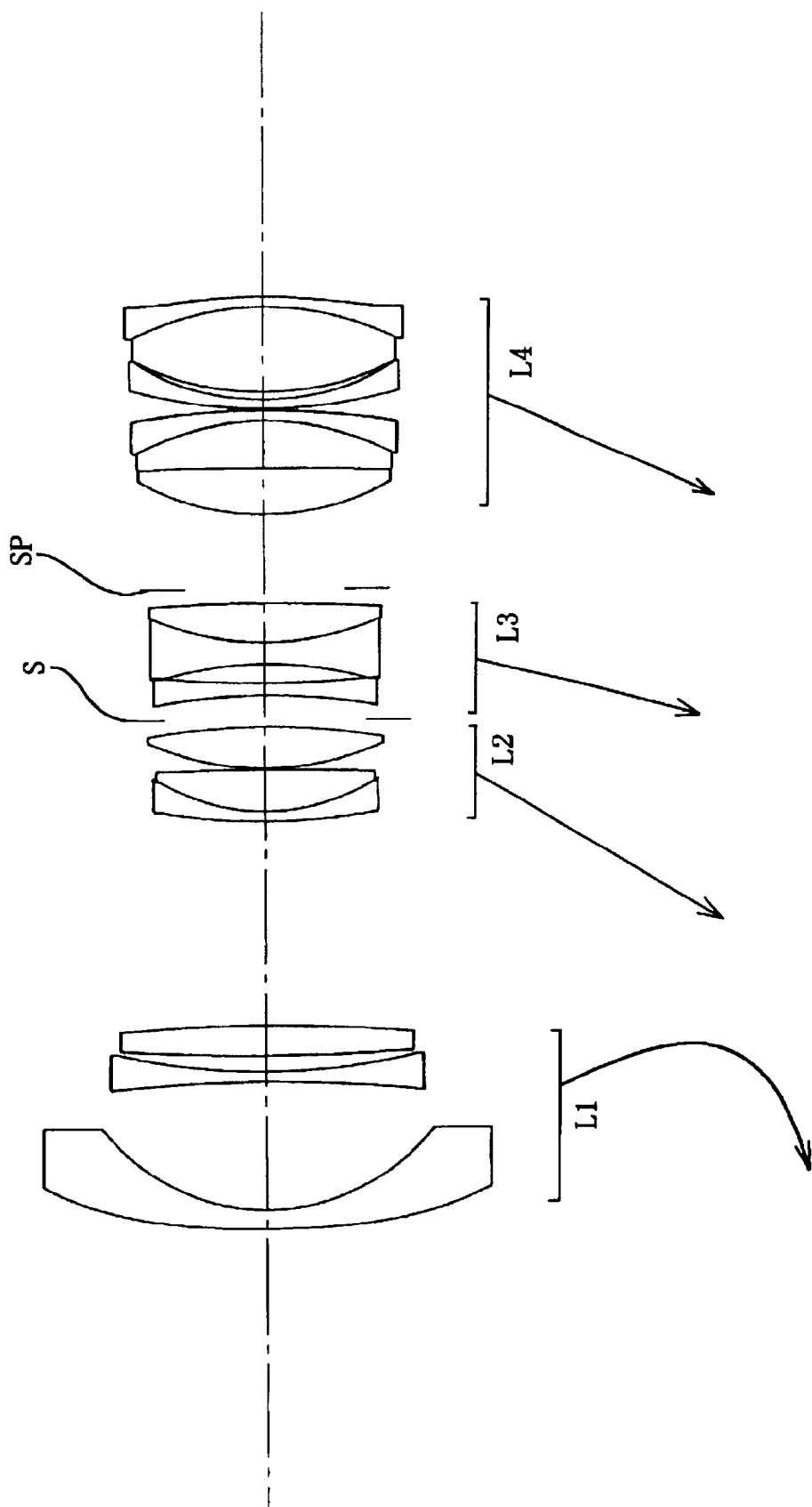
FIG. 1 shows a lens sectional view of a zoom lens system of numerical example 1 according to the present invention.
Figure 2:
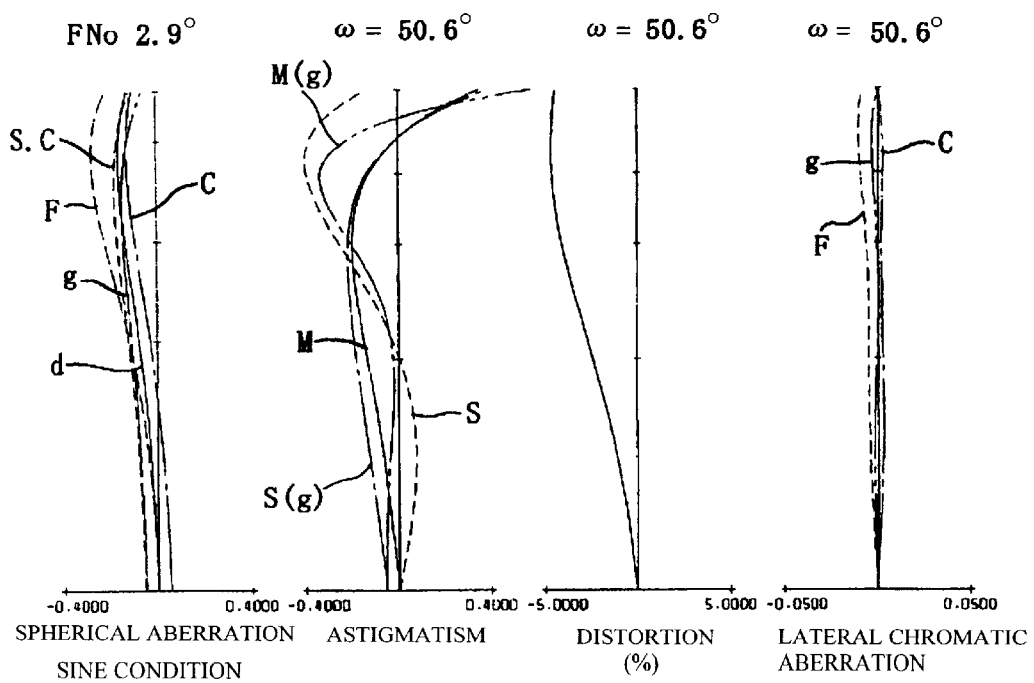
FIG. 2 shows graphic representations of aberrations in the zoom lens system at the wide-angle end of the numerical example 1 according to the present invention.
Figure 3:
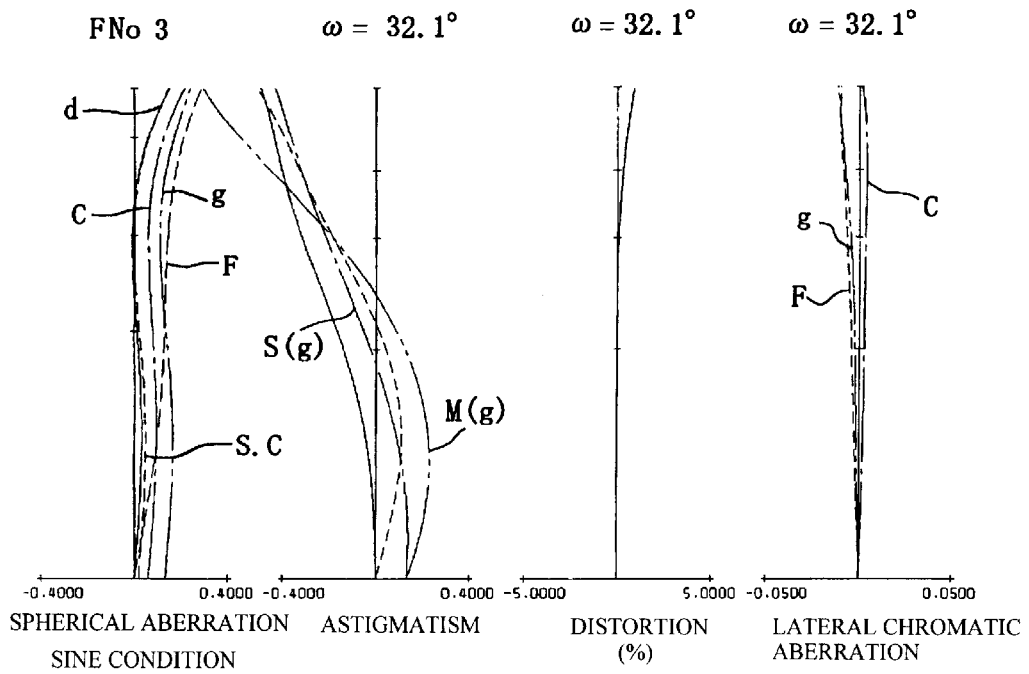
FIG. 3 shows graphic representations of aberrations in the zoom lens system at the telephoto end of the numerical example 1 according to the present invention.
Figure 4:
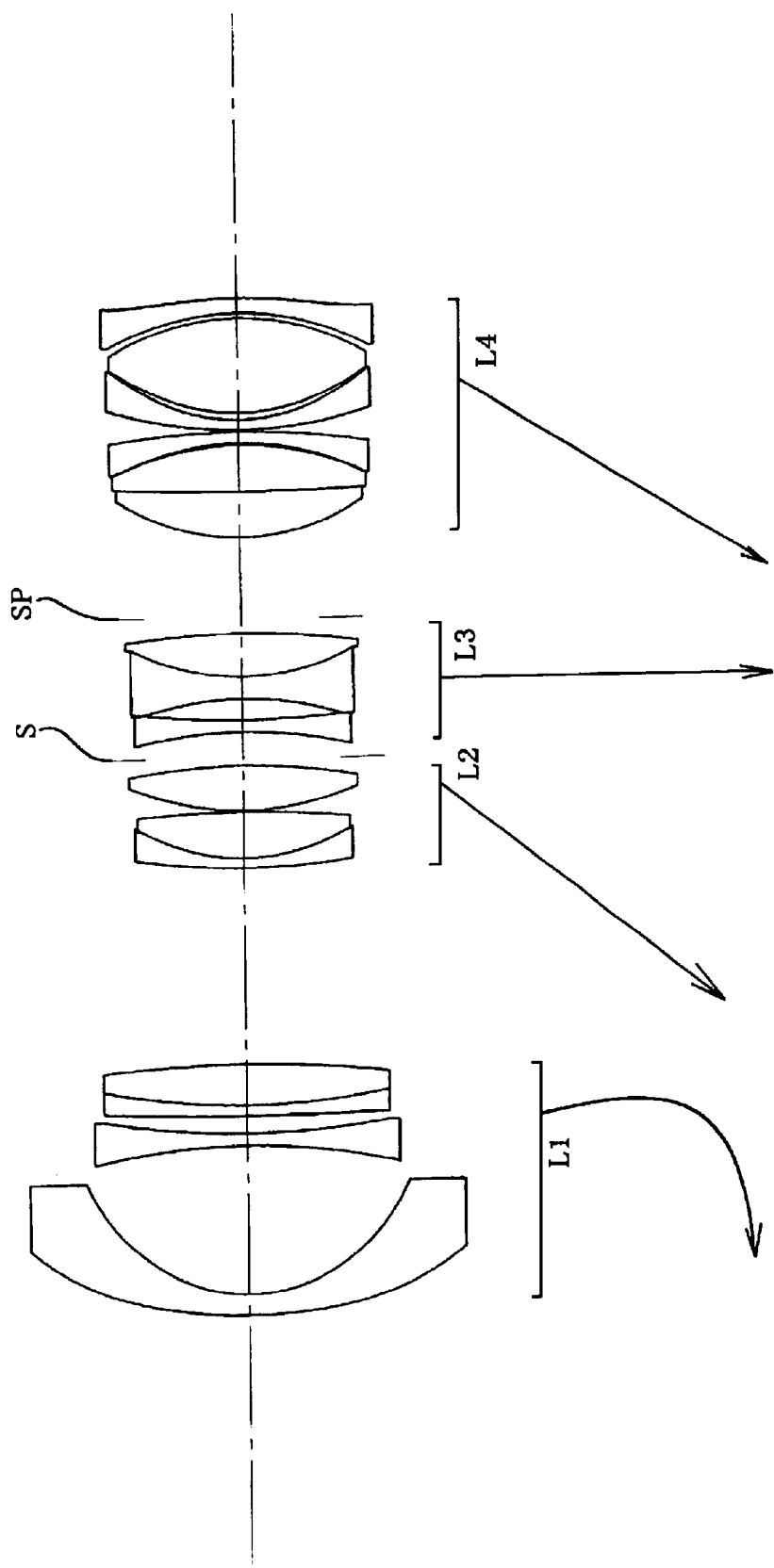
FIG. 4 shows a lens sectional view of a zoom lens system of numerical example 2 according to the present invention.
Figure 5:
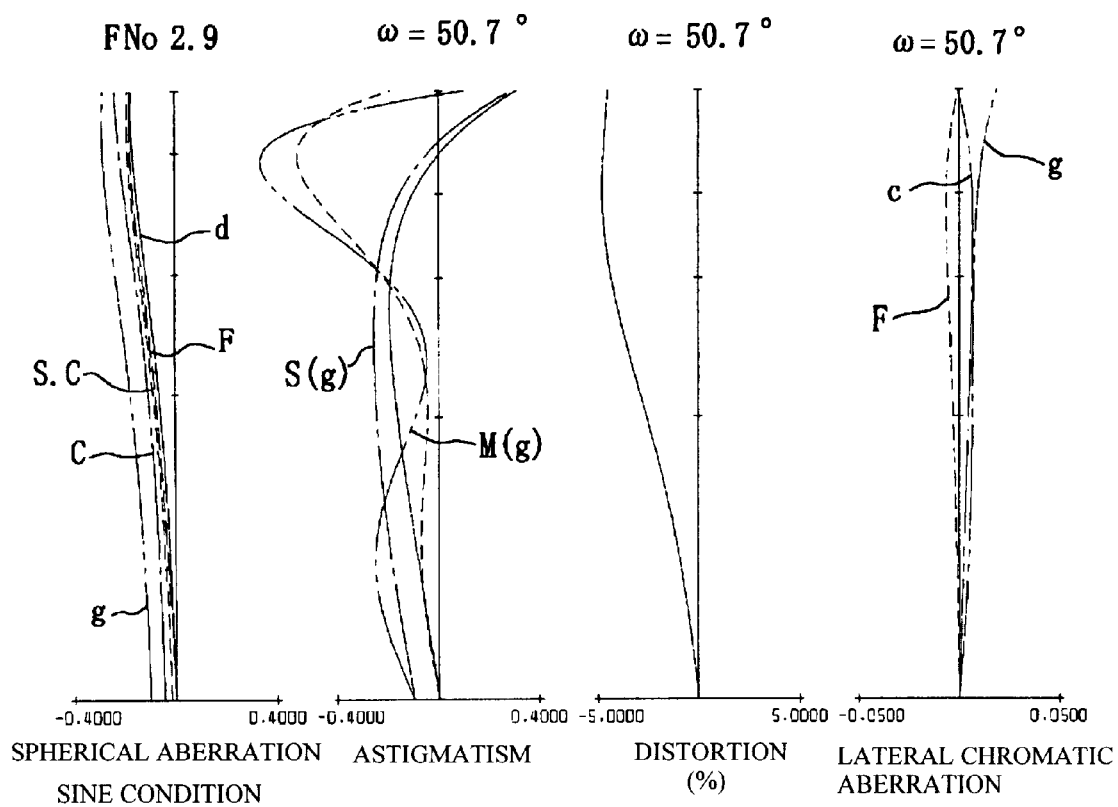
FIG. 5 shows graphic representations of aberrations in the zoom lens system at the wide-angle end of the numerical example 2 according to the present invention.
Figure 6:
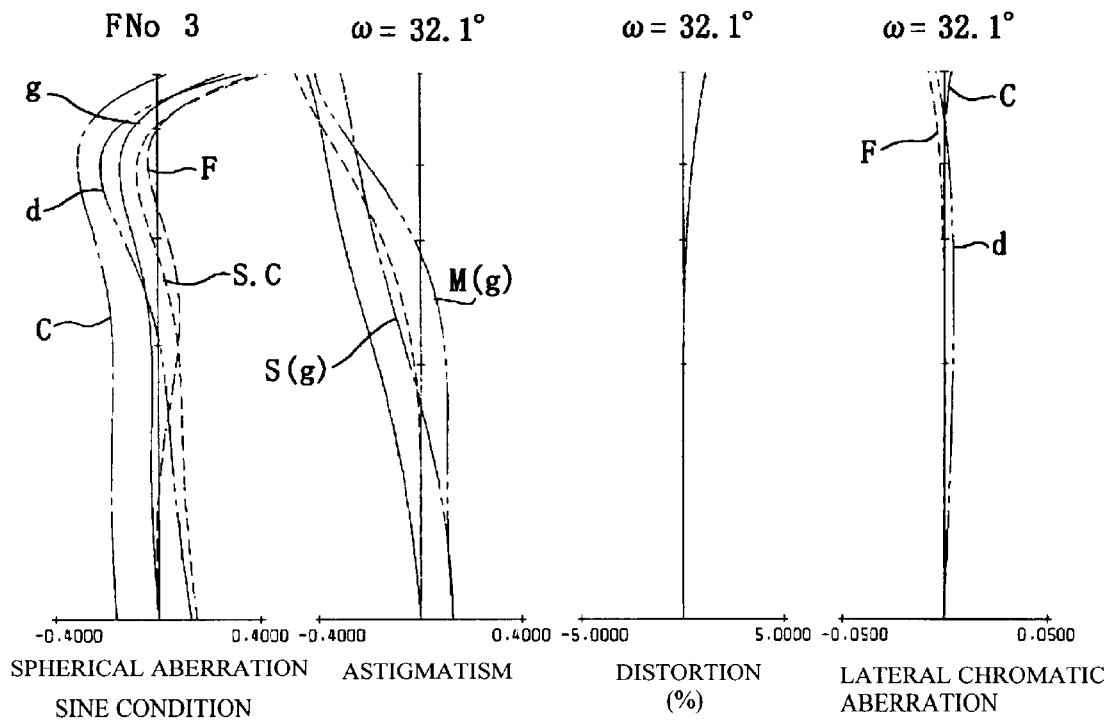
FIG. 6 shows graphic representations of aberrations in the zoom lens system at the telephoto end of the numerical example 2 according to the present invention.
Figure 7:
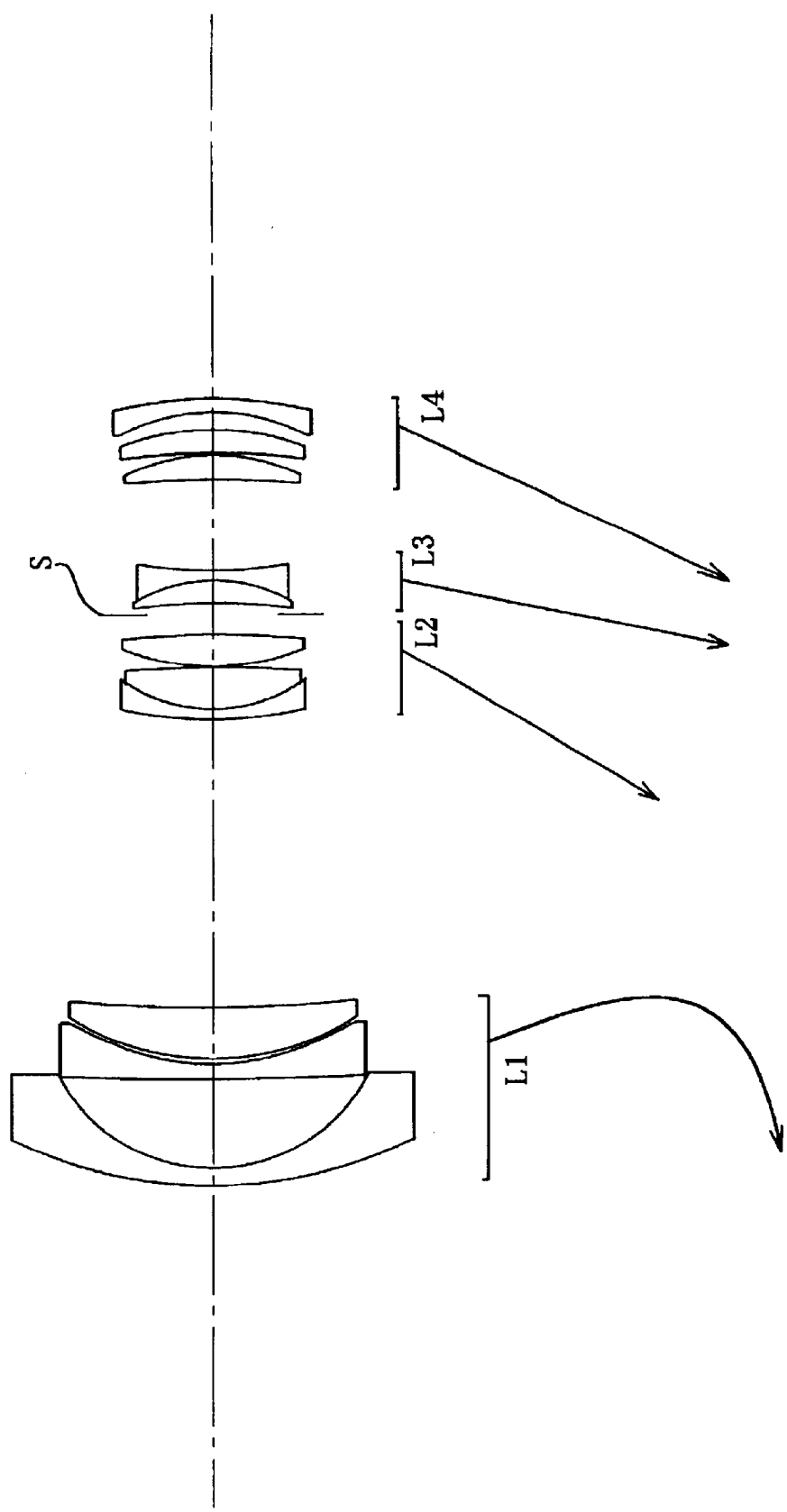
FIG. 7 shows a lens sectional view of a zoom lens system of numerical example 3 according to the present invention.
Figure 8:
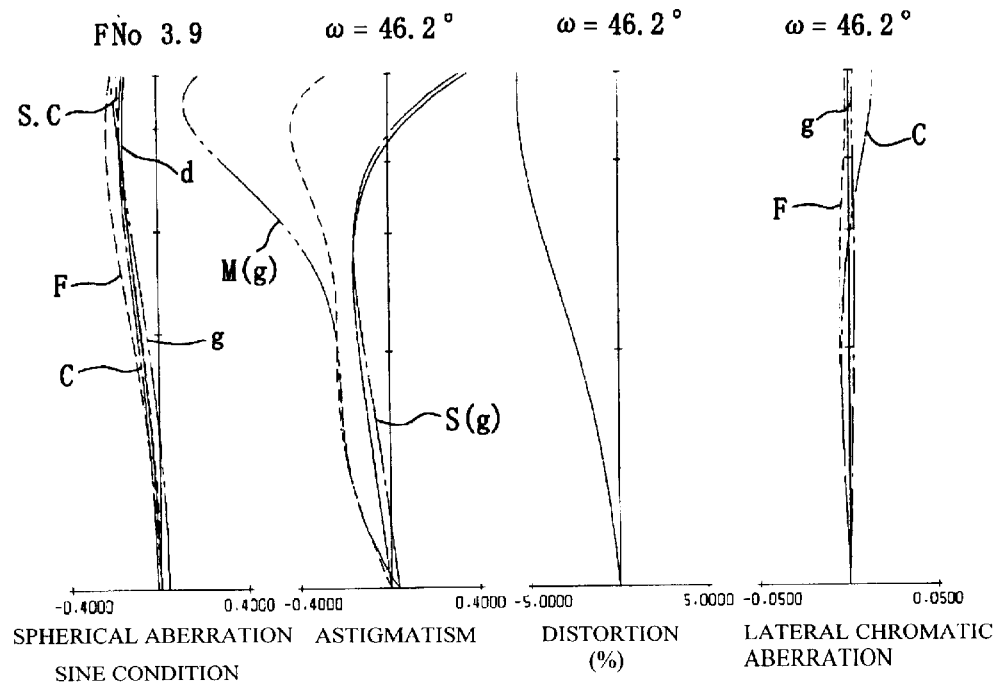
FIG. 8 shows graphic representations of aberrations in the zoom lens system at the wide-angle end of the numerical example 3 according to the present invention.
Figure 9:
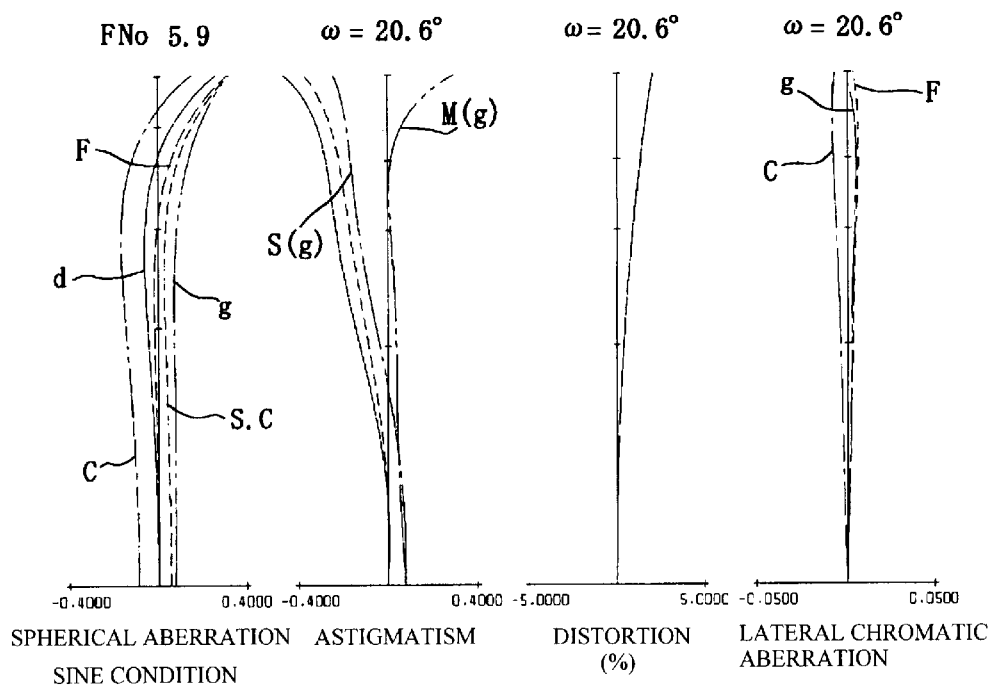
FIG. 9 shows graphic representations of aberrations in the zoom lens system at the telephoto end of the numerical example 3 according to the present invention.
Figure 10:
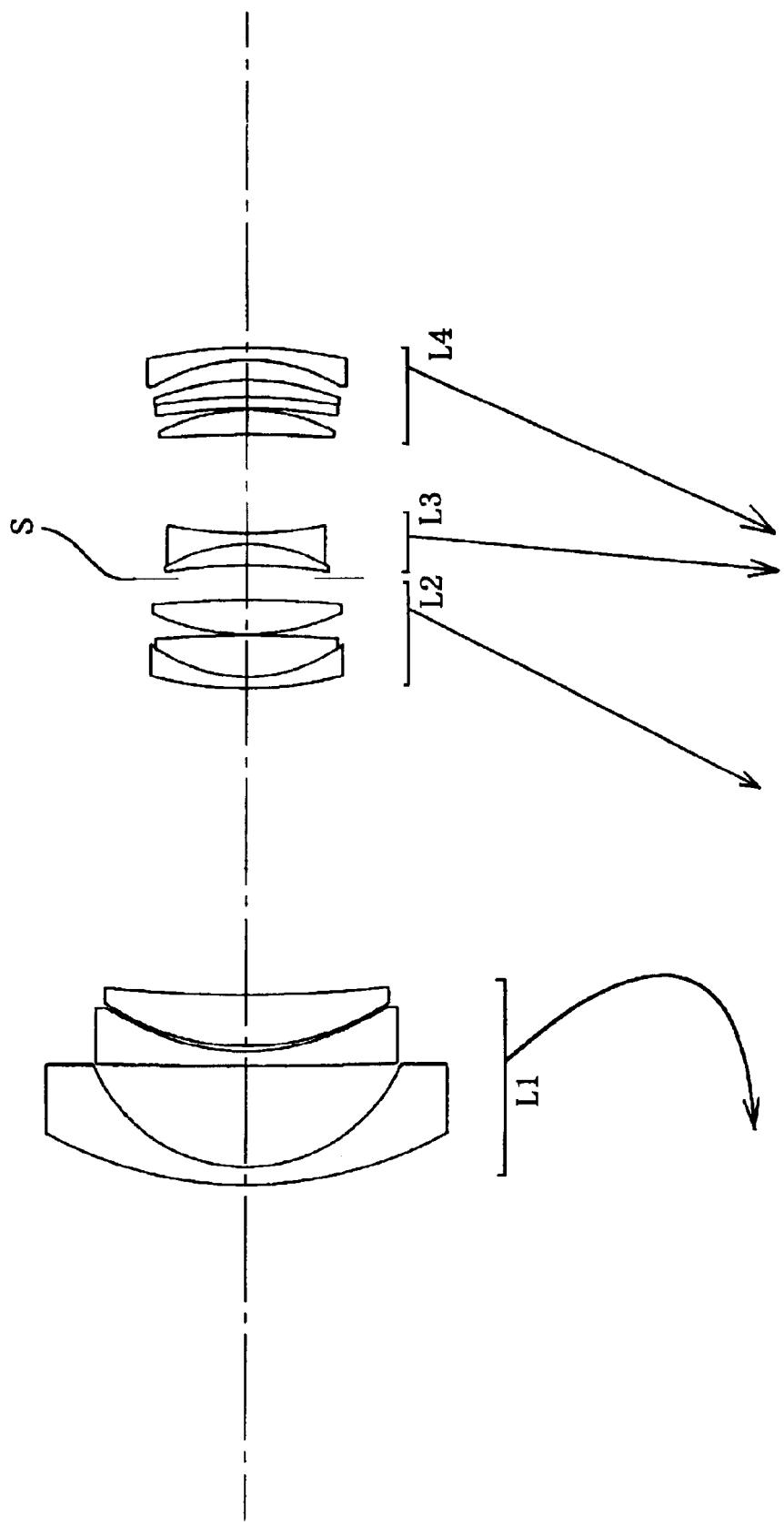
FIG. 10 shows a lens sectional view of a zoom lens system of numerical example 4 according to the present invention.
Figure 11:
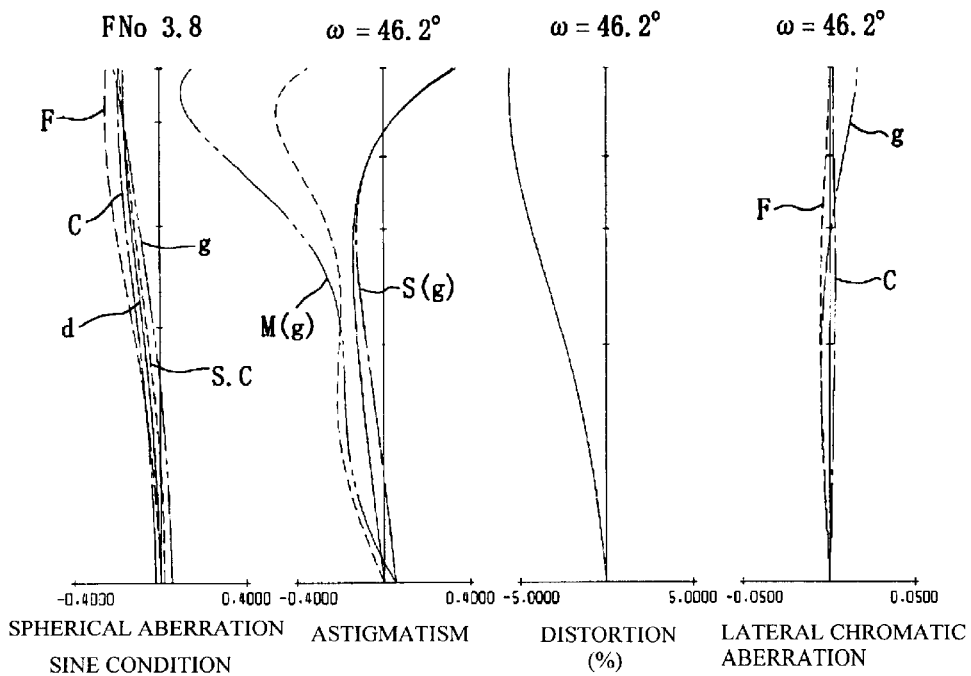
FIG. 11 shows graphic representations of aberrations in the zoom lens system at the wide-angle end of the numerical example 4 according to the present invention.
Figure 12:
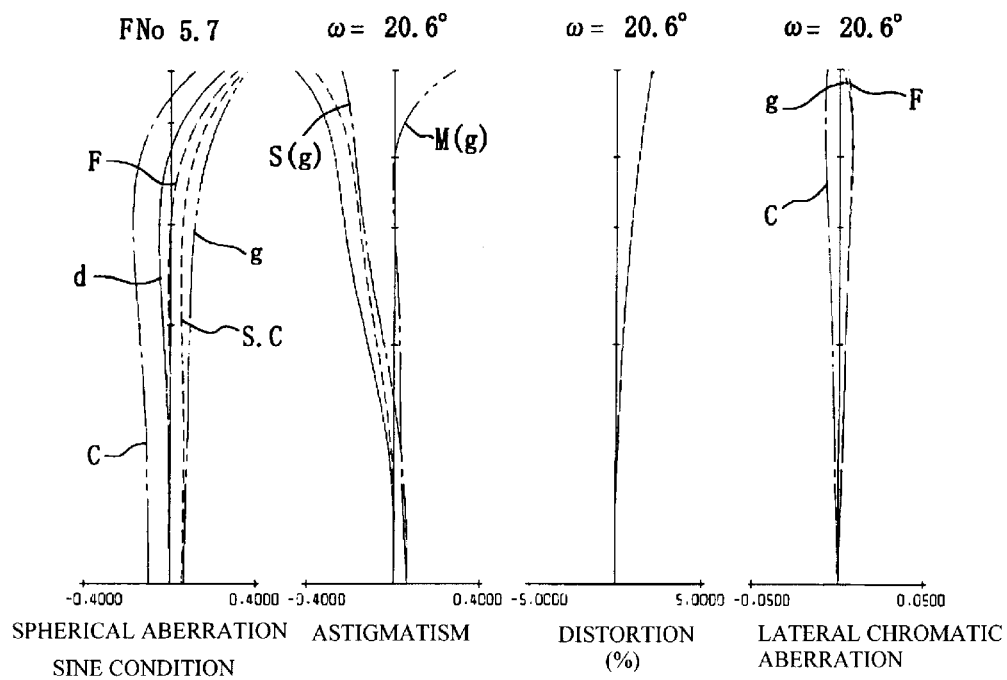
FIG. 12 shows graphic representations of aberrations in the zoom lens system at the telephoto end of the numerical example 4 according to the present invention.

FIG. 1 shows a lens sectional view of a zoom lens system of numerical example 1 according to the present invention. FIGS. 2 and 3 show graphic representations of aberrations in the zoom lens system at the wide-angle and telephoto ends of the numerical example 1 according to the present invention. FIG. 4 shows a lens sectional view of a zoom lens system of numerical example 2 according to the present invention. FIGS. 5 and 6 show graphic representations of aberrations in the zoom lens system at the wide-angle and telephoto ends of the numerical example 2 according to the present invention. FIG. 7 shows a lens sectional view of a zoom lens system of numerical example 3 according to the present invention. FIGS. 8 and 9 show graphic representations of aberrations in the zoom lens system at the wide-angle and telephoto ends of the numerical example 3 according to the present invention. FIG. 10 shows a lens sectional view of a zoom lens system of numerical example 4 according to the present invention. FIGS. 11 and 12 show graphic representations of aberrations in the zoom lens system at the wide-angle and telephoto ends of the numerical example 4 according to the present invention.

In a lens sectional view, L1 is a first unit of negative refractive power, L2 is a second unit of positive refractive power, L3 is a third unit of negative refractive power, and L4 is a fourth unit of positive refractive power. S is an aperture stop, and SP is a flare cutting stop. Arrows each denote a locus of each lens unit during zooming from the wide-angle end to the telephoto end.

For each graphic representation of aberration, in the spherical aberration a real line denotes line d, an alternate long and two short dashed line denotes line g, an alternate long and short dash line denotes line C, a dotted line denotes line F, a chain line denotes a sine condition. In the astigmatism, a real line denotes a sagittal ray, a dotted line denotes a meridional ray. In the transverse chromatic aberration, an alternate long and two short dashed line denotes line g, an alternate long and short dash line denotes line C, and a dotted line denotes line F.

In this embodiment, the zoom lens system zooming from the wide-angle end to the telephoto end while varying a separation between each lens units so that the following conditional expressions are satisfied where D1W is a separation between i-th and (i+1)-th lens units at a wide-angle end, DiT is a separation between the i-th and (i+1)-th lens units at a telephoto end:

$$D1W > D1T \quad (1)$$

$$D2W < D2T \quad (2)$$

$$D3W > D3T \quad (3)$$

In addition, a diffraction optical element ("DOE") is included in at least one of the lens units.

This embodiment satisfies the conditional expressions (1)–(3) during zooming from the wide-angle end to the telephoto end, by reciprocating the first unit with a locus (that draws a convex at an image side) different from those of other lens units, by moving the second and fourth units together to the object side, by moving the third unit to the object side, and by moving the stop S together with the third unit. In the examples 1 and 2, the flare cutting stop SP moves together with the third unit. Although the second and fourth units move with different loci during zooming, it is preferable that the second and fourth units move together in order to fix their relative positional relationship because the second and fourth units are those which include large manufacture errors or large deteriorated performance due to unit's inclination or decentering. The lens system thus includes four lens units and varies a separation between respective lens units during zooming, thereby realizing a reduced moving amount for zooming of each of the second, third and fourth units, and achieving a compact zoom lens system with a small stop diameter.

In addition, the instant embodiment provides at least one DOE to at least one of these four lens units and appropriately sets up its phase, thereby reducing generated chromatic aberration, in particular transverse chromatic aberration using the lens unit(s) that include the DOE, and properly correcting the chromatic aberration throughout the entire zoom range. Specifically, the first and/or fourth units are provided with a DOE.

The DOE is equipped with the optical performance different from the refraction by the conventional glass material. In other words, it characteristically has negative dispersion and anomalous dispersion, more concretely, Abbe number of vd=−3.45 and θgF=0.296. Application of this characteristic would be able to appropriately correct the transverse chromatic aberration.

The DOE for use with the inventive zoom lens system may have an aspheric effect by varying its pitch.

The inventive DOE may be a binary optics, which is an optical element produced in a binary manner by a lithography method for manufacturing a holographic optical element or manufactured by a mold produced by this method, or manufactured (as a so-called replica surface) by a method attaching a plastic or other film as a diffraction optical plane onto an optical surface.

The inventive zoom lens system preferably satisfies at least one of the following conditions to secure a high range zooming ratio and maintain a good aberrational correction:

(a-1) The DOE is included in the fourth unit, and the following conditional expression is satisfied where f4DOE is a focal length of only a diffraction component of the DOE, and ft is a focal length of an entire lens system at the telephoto end:

$$15 < f4DOE/ft < 1500 \quad (4)$$

The conditional equation (4) provides the fourth unit with the DOE having positive refractive power, and uses the anomalous dispersion to appropriately correct the transverse chromatic aberration from the line g to the line C. A satisfaction of the conditional equation (4) would properly correct the transverse chromatic aberration throughout the entire zoom range.

(a-2) The DOE is included in the first unit, and the following conditional expression is satisfied where f1DOE is a focal length of only a diffraction component of the DOE and ft is a focal length of an entire lens system at the telephoto end:

$$-1500 < f1DOE/ft < -15 \quad (5)$$

The conditional equation (5) provides the first unit with the DOE having negative refractive power, and uses the anomalous dispersion to appropriately correct the transverse chromatic aberration from the line g to the line C. A satisfaction of the conditional equation (5) would properly correct the transverse chromatic aberration over the entire zoom range.

(a-3) The DOE is included in the first and fourth units, the following conditional expressions are satisfied where f1DOE is a focal length of only a diffraction component of the DOE included in the first unit, f4DOE is a focal length of only a diffraction component of the DOE included in the fourth unit, and ft is a focal length of an entire lens system at the telephoto end:

$$15 < f4DOE/ft < 1500 \quad (4)$$

$$-1500 < f1DOE/ft < -15 \quad (5)$$

The conditional equation (4) has been described in connection with (a-1), while the conditional equation (5) has been described in connection with (a-2).

(a-4) The following conditional expressions are satisfied where fw and ft are focal lengths of an entire lens system at the wide-angle and telephoto ends, respectively, and fi is a focal length of the i-th lens unit:

$$0.7 < |f1|/\sqrt{fw \cdot ft} < 1.1 \quad (6)$$

$$0.6 < f2/\sqrt{fw \cdot ft} < 1.4 \quad (7)$$

$$1.05 < |f3|/f2 < 1.5 \quad (8)$$

$$1.05 < f4/f2 < 2.5 \quad (9)$$

The conditional expression (6) defines a range of a focal length of the first unit. As the negative refractive power of the first unit becomes strong enough to exceed the lower limit, various aberrations generated in the first unit become large and well-balanced corrections to them using other lens units would be difficult. On the other hand, as the negative refractive power of the first unit becomes weak enough to exceed the upper limit, the lens system becomes undesirably large although it is advantageous of aberrational corrections.

The conditional expression (7) defines a range of a focal length of the second unit. As the positive refractive power of the second unit becomes strong enough to exceed the lower limit, various aberrations including the spherical aberration generated in the second unit become large and well-balanced corrections to them using other lens units would be difficult, although it is advantageous of a shortened span and the small stop diameter. On the other hand, as the positive refractive power of the second unit becomes weak enough to exceed the upper limit, the lens system becomes undesirably large although it is advantageous of aberrational corrections.

The conditional equations (8) and (9) respectively define focal lengths of the third and fourth units relative to the second unit, and are necessary to reconcile the miniaturization and high performance. As the refractive power of each of the third and forth units becomes strong enough to exceed the lower limit, the spherical aberration, coma, and astigmatism generated in the third and fourth units become large and well-balanced corrections to them using other lens units would be difficult. On the other hand, as the refractive power of each of the third and fourth units becomes weak enough to exceed the upper limit, the lens span becomes undesirably long.

(a-5) The following conditional expression is satisfied where fw is a focal length of an entire lens system at the wide-angle end, and SKw is a back focal distance at the wide-angle end:

$$1.6 < SKw/fw < 2.8 \quad (10)$$

The conditional expression (10) is to maintain a necessary back focal distance. The back focal distance short enough to exceed the lower limit would eliminate a space to locate a quick return mirror, etc., while the back focal distance long enough to exceed the upper limit would undesirably cause the long lens span.

(a-6) The first lens unit has such an aspheric surface that negative refractive power of the aspheric surface decreases from a center of the lens to a peripheral of the lens.

(a-7) The second and fourth units move together during zooming.

(a-8) During zooming the first unit moves while drawing a convex locus at a side of an image surface.

(a-9) A stop is located adjacent to the third unit at the object side or an image side.

(a-10) The fourth unit has such an aspheric surface that positive refractive power of the aspheric surface decreases from a center of the lens to a peripheral of the lens.

(a-11) The following conditional expression is satisfied where θ is an angle between a ray incident to and emitted from the DOE and a plane normal of the DOE:

$$-30 < \theta < 30 \quad (11)$$

The conditional equation (11) means that an angle of incidence to the DOE and an angle of exit from the DOE are set so that a position in the ray of light and the angle of field change as small as possible, thereby realizing the high diffraction efficiency. More preferably, the conditional equation (11) is replaced with the following conditional equation (11'):

$$-15 < \theta < 15 \quad (11')$$

(a-12) The DOE has a layered structure.

Usually, the diffraction efficiency at a designed order (e.g., first order) decreases with a distance from the optimized beam wavelength, but neighboring orders other than the designed order, such as 0-th order and second order diffraction light tend to increase.

An increase of the non-designed order diffraction light would cause flare when reaching an image surface, and lower the resolution for the optical system. On the other hand, the layered structure of a diffraction surface made of optical materials having different refractive indexes would maintain the diffraction efficiency at the designed order over a broader wavelength range. The inventive zoom lens uses this layered structure of diffraction optical surface for better images.

(a-13) A conditional expression is satisfied where Ci is a phase coefficient, h is a height from a center of an optical axis, $\lambda_o$ is a reference wave length, and $Q(h) = (C1 \cdot h^2 + C2 \cdot h^4 + C3 \cdot h^6 + \ldots)/\lambda_o$:

$$|dQ(h)/dh| < 30 \quad (12)$$

The conditional expression (12) defines a minimum width for each zone in the DOE. As it exceeds the conditional expression (12), the width of the zone becomes too small, and causes the large number of zones in the DOE, making the process difficult. The conditional expression (12) is prepared based on the incident height and wavelength with a consolidated unit, such as "mm" and "μm".

A description will now be given of the numerical examples.

NUMERICAL EXAMPLE 1

The first unit includes a meniscus negative lens having a convex surface at the object side, a negative lens and a positive lens, and uses such an aspheric surface on the first lens surface at the object side to reduce a barrel-shaped distortion generated at the wide-angle side that its positive refractive power increases (negative refractive power decreases) from a center of the lens to a peripheral of the lens. For a well-balanced correction to various aberrations with the smaller number of lenses, the second unit includes a positive lens and a cemented lens of negative and positive lenses, while the third unit includes a negative lens and a cemented lens of negative and positive lenses. The fourth unit has three positive lenses and three negative lenses. The surface closest to the image plane in the fourth unit has such an aspheric surface that its positive refractive power decreases from the center of the lens to the peripheral of the lens. Use of the aspheric surface for the fourth unit would properly correct the high-order sagittal curvature of field generated at the wide-angle side. The fourth unit uses a DOE at an image-plane side of the twelfth lens.

The second and third lenses in the first unit serve to focus. The lightweight lens units would perform prompt autofocusing when applied to an autofocus camera due to the lightweight focus lens.

NUMERICAL EXAMPLE 2

The first unit includes a meniscus negative lens having a convex surface at the object side, a cemented lens of negative and positive lenses, and uses such an aspheric surface on the first lens surface at the object side to reduce a barrel-shaped distortion generated at the wide-angle side that its positive refractive power increases from a center of the lens to a peripheral of the lens. For a well-balanced correction to various aberrations with the smaller number of lenses, the second unit includes a positive lens a cemented lens of negative and positive lenses, while the third unit includes a negative lens and a cemented lens of negative and positive lenses. The fourth unit has three positive lenses and three negative lenses. The surface closest to the image plane in the fourth unit is such an aspheric surface that its positive refractive power decreases from the center of the lens to the peripheral of the lens. Use of the aspheric surface for the fourth unit would properly correct the high-order sagittal curvature of field generated at the wide-angle side. The fourth unit uses a DOE between the eleventh and twelfth lenses.

Even in this example, the second, third and fourth lenses in the first unit serve to focus. The lightweight lens units would perform prompt autofocusing when applied to a recently widespread autofocus camera due to the lightweight focus lens.

NUMERICAL EXAMPLE 3

The first unit includes a meniscus negative lens having a convex surface at the object side, a negative lens at the image side having such an aspheric surface that its negative refractive power decreases from the center of the lens to the peripheral of the lens, and a positive lens, and uses the aspheric surface to reduce a barrel-shaped distortion generated at the wide-angle side. For a well-balanced correction to various aberrations with the smaller number of lenses, the second unit includes a positive lens a cemented lens of negative and positive lenses, while the third unit includes a cemented lens of positive and negative lenses. The fourth unit has two positive lenses and one negative lens. The surface closest to the image plane in the fourth unit is such an aspheric surface that its positive refractive power decreases from the center of the lens to the peripheral of the lens. Use of the aspheric surface for the fourth unit would properly correct the high-order sagittal curvature of field generated at the wide-angle side. The fourth unit uses a DOE at the image side of the tenth lens. The second and third lenses in the first unit may serve to focus.

NUMERICAL EXAMPLE 4

The first unit includes a meniscus negative lens having a convex surface at the object side, a negative lens at the image side having such an aspheric surface that its negative refractive power decreases from the center of the lens to the peripheral of the lens, and a positive lens, and uses the aspheric surface to reduce a barrel-shaped distortion generated at the wide-angle side. For a well-balanced correction to various aberrations with the smaller number of lenses, the second unit includes a positive lens a cemented lens of negative and positive lenses, while the third unit includes a cemented lens of positive and negative lenses. The fourth unit has two positive lenses and two negative lenses. The surface closest to the image plane in the fourth unit is such an aspheric surface that its positive refractive power decreases from the center of the lens to the peripheral of the lens. Use of the aspheric surface for the fourth unit would properly correct the high-order sagittal curvature of field generated at the wide-angle side. The fourth unit uses a DOE between the tenth and eleventh lenses. The second and third lenses in the first unit may serve to focus.

A description will now be given of the DOE according to the present invention.

Figure 13:
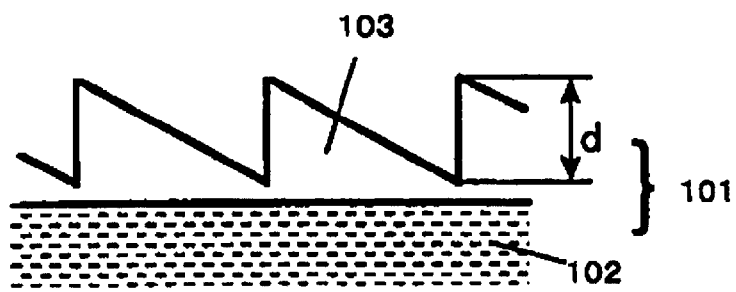
FIG. 13 is a view for explaining a diffraction optical element according to the present invention.
Figure 15:
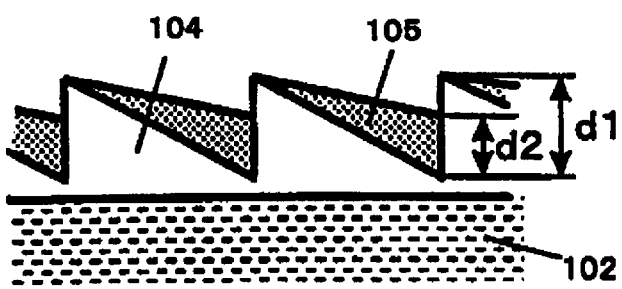
FIG. 15 is a view for explaining a diffraction optical element according to the present invention.
Figure 17:
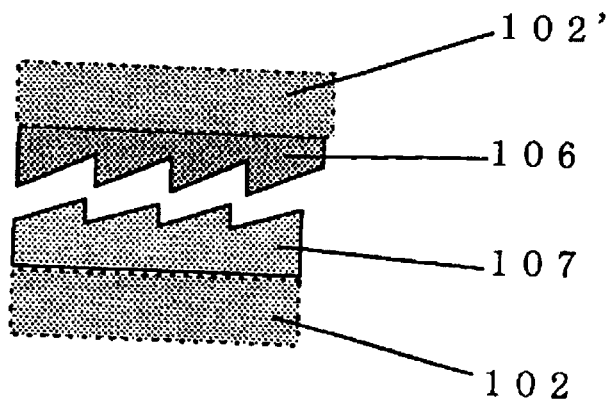
FIG. 17 is a view for explaining a diffraction optical element according to the present invention.

The DOE for use with the embodiment may employ a one-layer structure, such as a one-layer Kinoform shape shown in FIG. 13, a two-layer structure, such as two stacked layers each having a different grating thickness shown in FIG. 15, and two layers holding an air gap shown in FIG. 17.

Figure 14:
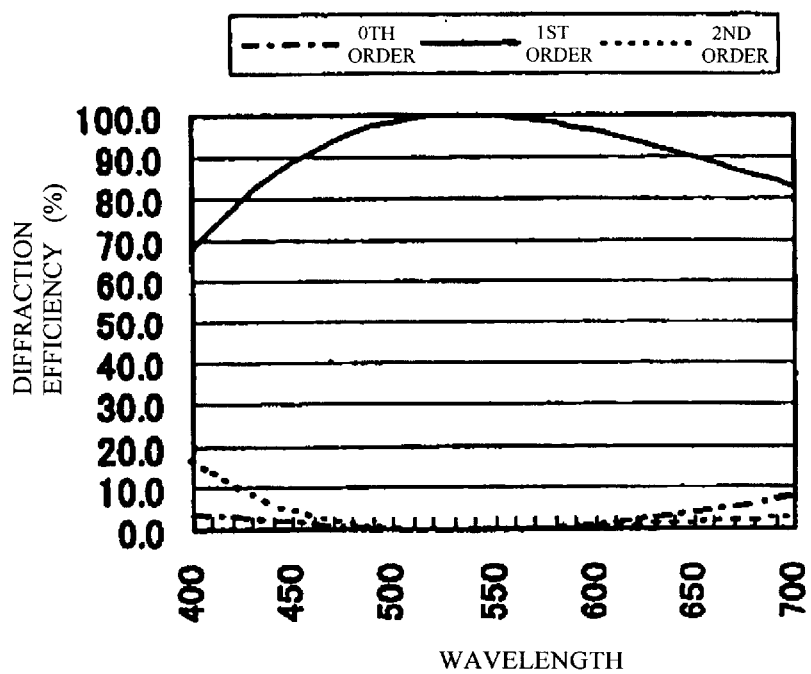
FIG. 14 is a view for explaining a wavelength dependence of the diffraction optical element according to the present invention.

FIG. 14 shows the wavelength dependence for the diffraction efficiency at the first diffraction light of the DOE 101 shown in FIG. 13. An actual structure of the DOE 101 applies ultraviolet cure resin onto a surface of a base 102 so as to form a diffraction grating 103 having a grating thickness d so that the resin part has 100% of the diffraction efficiency at the first order light in response to the wavelength of 530 nm.

As apparent from FIG. 14, the diffraction efficiency of the designed order decreases with an interval from the wavelength 530 nm, whereas the diffraction efficiencies of the $0^{th}$ order diffraction light and the second order diffraction light, near the designed order increase. An increase of the diffraction light other than the designed order would cause flare and lower the resolution in the optical system.

Figure 16:
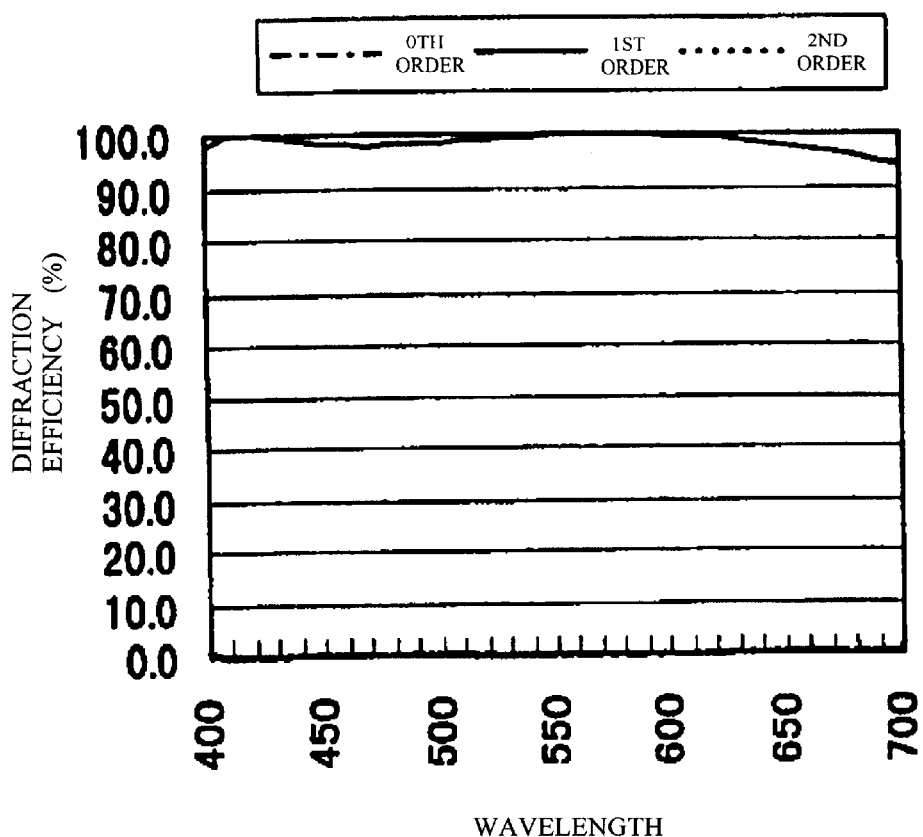
FIG. 16 is a view for explaining a wavelength dependence of the diffraction optical element according to the present invention.

FIG. 16 shows the wavelength dependence for the diffraction efficiency at the first diffraction light of the DOE formed by layering two diffraction gratings 104 and 105 shown in FIG. 15. In FIG. 15, a first diffraction grating 104 including ultraviolet cure resin (nd=1.499, vd=54) is formed on the base 102, and a second diffraction grating 105 including other ultraviolet cure resin (nd=1.598, vd=28) is formed on the first diffraction grating 104. A combination of these materials sets the grating thickness dl of the first diffraction grating 104 to be 13.8 µm, and the grating thickness d2 of the second diffraction grating 105 to be 10.5 µm.

As understood from FIG. 16, the layered structure of the DOE provides the designed order with the high diffraction efficiency of 95% or higher over the entire operating wavelength range. The layered structure of the inventive DOE may improve the optical performance further.

Figure 18:
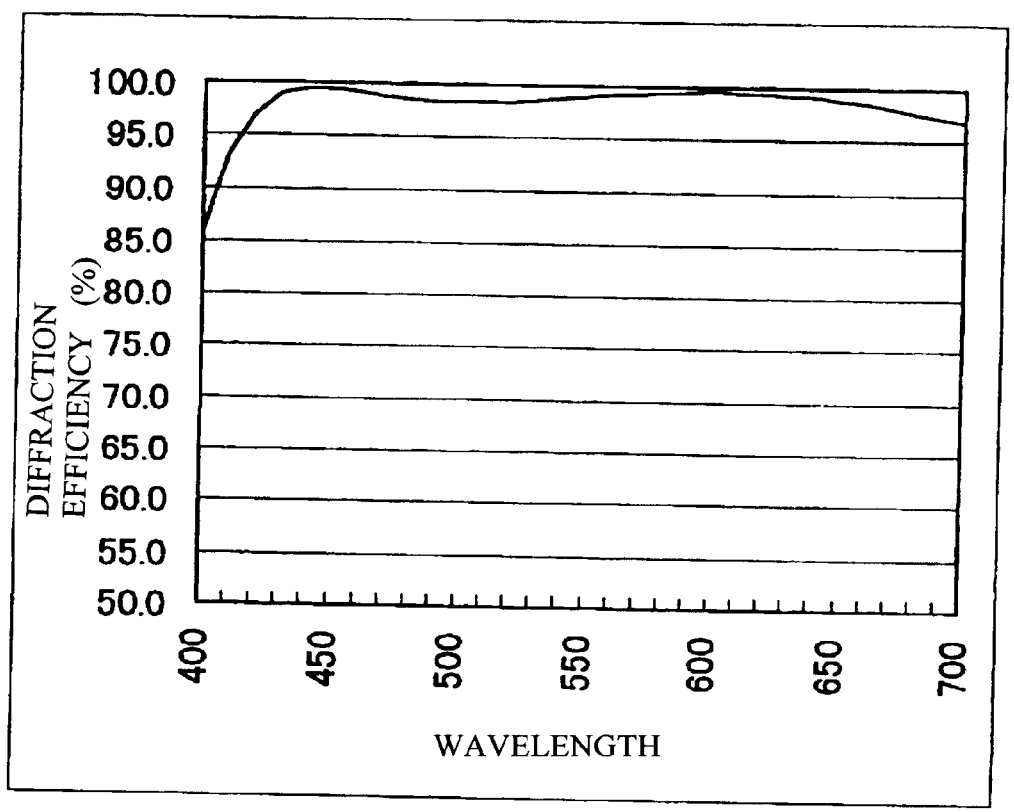
FIG. 18 is a view for explaining a wavelength dependence of the diffraction optical element according to the present invention.

FIG. 18 shows the wavelength dependence for the diffraction efficiency at the first diffraction light of the DOE using two diffraction gratings 106 and 107 shown in FIG. 17. In FIG. 17, the first diffraction grating 106 made of ultraviolet cure resin is formed on the base 102 while the second diffraction grating 107 made of ultraviolet cure resin is formed on a base 102'. The first and second diffraction gratings 106 and 107 are fixed relative to each other while spaced from each other by a predetermined interval. The first and second diffraction gratings 106 and 107 form a DOE as one member with bases 102 and 102'. As understood from FIG. 18, the designed order has the high diffraction efficiency of 95% or higher over the entire usable wavelength range.

The above layered DOE does not limited a material to ultraviolet cure resin and may use plastic and other materials. Depending upon base's material, the first diffraction grating 104 may be formed directly onto the base. In addition, it is not necessary to use different grating thickness.

In FIG. 17, a grating shape that is not formed on a surface of the DOE shows a good dustproof characteristic and facilitates the DOE manufacture.

Figure 19:
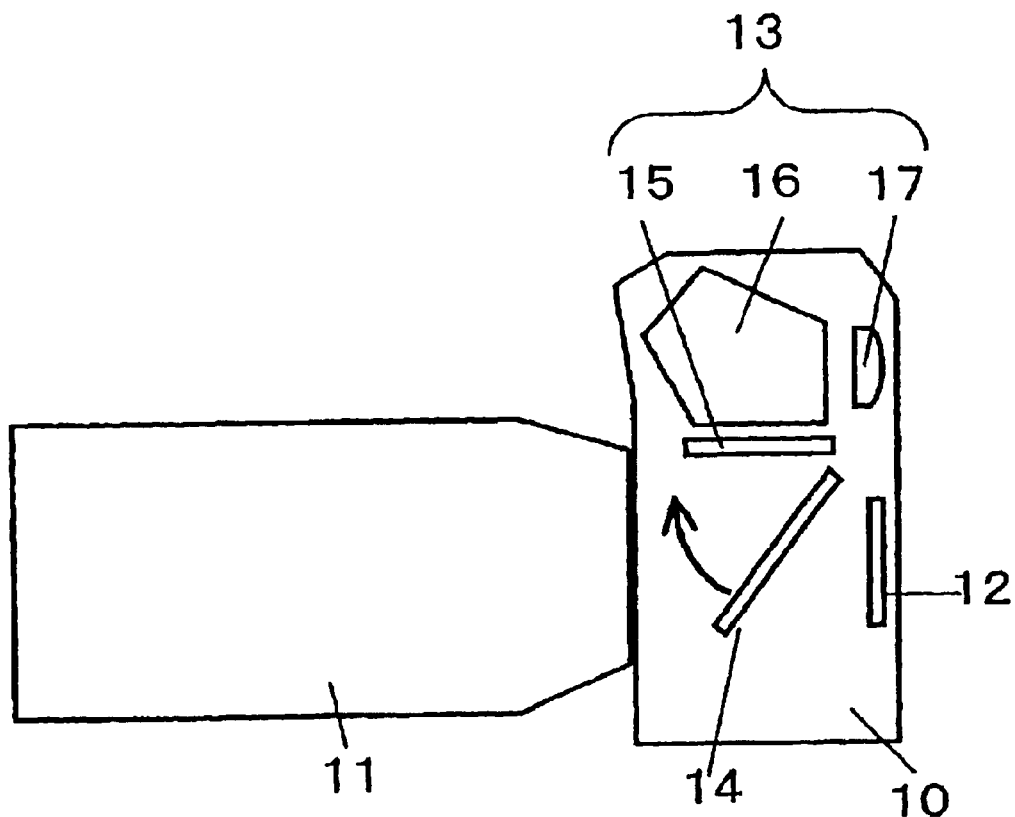
FIG. 19 is a schematic view of a principal part in an optical apparatus using the zoom lens system according to the present invention.

Next follows a description of an embodiment of an electronic still camera (as an optical apparatus) using the inventive zoom lens system, with reference to FIG. 19.

In FIG. 19, 10 denotes a camera body, 11 denotes the inventive zoom lens system, 12 denotes an image pick-up means, such as a film and a CCD, 13 denotes a finder system including a focus plate 15 on which a subject image is formed, pentagonal prism 16 as image inversion means, and an eyepiece 17 for observing the subject image on the focus plate 15.

As shown in FIG. 19, the inventive zoom lens system applied to the electronic still camera realizes a small optical apparatus having good optical performance.

Next follows a description of the numerical examples. In each numerical example, "ri" represents a radius of curvature of an i-th lens surface in order from the object side. "di" represents a lens thickness or a separation of air between the i-th and (i+1)-th in order from the object side. "ni" and "vi" are the refractive index and Abbe number of the material of the i-th optical member in order from the object side.

An aspheric shape is expressed by the following equation:

$$X = \frac{(1/R)H^2}{1+\sqrt{1-(H/R)^2}} + AH^2 + BH^4 + CH^6 + DH^8 + EH^{10} \quad (13)$$

where R is the radius of curvature at the center part of the lens surface, X is a displacement in the optical axis direction, H, A, B, C, D, E are aspheric coefficients.

A shape of the DOE is expressed by the following equation, where $\lambda_o$ is a reference wavelength (line d), h is a distance from the optical axis, and $\Phi(h)$ is a phase:

$$\Phi(h) = 2\pi\lambda_o(C1 \cdot h^2 + C2 \cdot h^4 + C3 \cdot h^6 + \ldots) \quad (14)$$

Table 1 shows a relationship between the above equations and various numerical values in the numerical examples. The last surface in the numerical examples is a dummy surface for use with a design.

NUMERICAL EXAMPLE 1

| f = 17.8~34.5 | FNo = 1: 2.9~3.0 | 2ω = 101.2°~64.2° | |
|---|---|---|---|
| r1 = 111.231(Aspheric) | d1 = 2.00 | n1 = 1.77250 | v1 = 49.6 |
| r2 = 22.013 | d2 = 13.51 | | |
| r3 = −152.350 | d3 = 1.20 | n2 = 1.88300 | v2 = 40.8 |
| r4 = 67.873 (DOE) | d4 = 1.70 | | |
| r5 = 238.556 | d5 = 3.15 | n3 = 1.84666 | v3 = 23.9 |
| r6 = −161.947 | d6 = Variable | | |
| r7 = 66.264 | d7 = 1.00 | n4 = 1.87400 | v4 = 35.3 |
| r8 = 21.532 | d8 = 4.45 | n5 = 1.49700 | v5 = 81.5 |
| r9 = −370.756 | d9 = 0.15 | | |
| r10 = 31.220 | d10 = 4.35 | n6 = 1.71999 | v6 = 50.2 |
| r11 = −68.333 | d11 = Variable | | |
| r12 = (Stop) | d12 = 2.51 | | |
| r13 = −69.491 | d13 = 1.20 | n7 = 1.78800 | v7 = 47.4 |
| r14 = 106.031 | d14 = 2.17 | | |
| r15 = −37.017 | d15 = 2.20 | n8 = 1.65100 | v8 = 56.2 |
| r16 = 30.091 | d16 = 4.20 | n9 = 1.84666 | v9 = 23.9 |
| r17 = −185.908 | d17 = 1.50 | | |
| r18 = 0.000 | d18 = Variable | | |
| r19 = 26.825 | d19 = 4.80 | n10 = 1.51742 | v10 = 52.4 |
| r20 = −427.697 | d20 = 5.00 | n11 = 1.71999 | v11 = 50.2 |
| r21 = −29.184 | d21 = 1.00 | n12 = 1.84666 | v12 = 23.9 |
| r22 = −88.714 (DOE) | d22 = 0.20 | | |
| r23 = 49.188 | d23 = 1.00 | n13 = 1.84666 | v13 = 23.9 |
| r24 = 25.770 | d24 = 0.90 | | |
| r25 = 31.363 | d25 = 9.00 | n14 = 1.49700 | v14 = 81.5 |
| r26 = −31.375 | d26 = 1.00 | n15 = 1.80610 | v15 = 40.9 |
| r27 = −55.827(Aspheric) | d27 = Variable | | |
| r28 = ∞ | | | |

| Focal Length | 17.77 | 28.36 | 34.50 |
|---|---|---|---|
| Variable Separation | | | |
| d6 | 21.50 | 7.39 | 3.62 |
| d11 | 0.73 | 6.09 | 8.56 |
| d18 | 7.84 | 2.49 | 0.01 |
| d27 | 0.00 | 11.07 | 17.84 |
| skinf | 40.05 | 40.05 | 40.05 |

Aspheric Coefficients

1st Surface

| b | c | d | e |
|---|---|---|---|
| 8.818996e−06 | −9.231865e−09 | 1.249208e−11 | −7.924879e−15 |
| | | | f |
| | | | 1.084347e−18 |

4th Surface (DOE)

| C1 | C2 | C3 |
|---|---|---|
| 2.08913e−4 | 1.07048e−6 | −2.84697e−9 |

22th Surface (DOE)

| C1 | C2 | C3 |
|---|---|---|
| −9.84866e−6 | −2.72723e−7 | −6.12148e−11 |

27th Surface

| b | c | d | e |
|---|---|---|---|
| 1.450897e−05 | 4.924021e−09 | 1.637347e−10 | −4.801349e−13 |
| | | | f |
| | | | 1.153104e−15 |

NUMERICAL EXAMPLE 2

| f = 17.7~34.5 | FNo = 1: 2.9~3.0 | 2ω = 101.4°~64.2° | |
|---|---|---|---|
| r1 = 66.970(Aspheric) | d1 = 2.00 | n1 = 1.77250 | v1 = 49.6 |
| r2 = 19.347 | d2 = 14.65 | | |
| r3 = −78.948 | d3 = 1.20 | n2 = 1.87400 | v2 = 35.3 |
| r4 = 101.103 | d4 = 1.70 | | |
| r5 = 416.314 | d5 = 1.00 | n3 = 1.49700 | v3 = 81.5 |
| r6 = 84.859 | d6 = 4.00 | n4 = 1.74077 | v4 = 27.8 |
| r7 = −147.377 | d7 = Variable | | |
| r8 = 82.834 | d8 = 1.00 | n5 = 1.83400 | v5 = 37.2 |
| r9 = 25.300 | d9 = 4.45 | n6 = 1.49700 | v6 = 81.5 |
| r10 = −125.818 | d10 = 0.15 | | |
| r11 = 35.624 | d11 = 4.35 | n7 = 1.71999 | v7 = 50.2 |
| r12 = −73.358 | d12 = Variable | | |
| r13 = (Stop) | d13 = 2.51 | | |
| r14 = −55.470 | d14 = 1.20 | n8 = 1.81554 | v8 = 44.4 |
| r15 = 115.507 | d15 = 2.06 | | |
| r16 = −38.980 | d16 = 2.20 | n9 = 1.69680 | v9 = 55.5 |
| r17 = 27.996 | d17 = 4.20 | n10 = 1.84666 | v10 = 23.9 |
| r18 = −101.029 | d18 = 1.50 | | |
| r19 = 0.000 | d19 = Variable | | |
| r20 = 25.853 | d20 = 4.50 | n11 = 1.51742 | v11 = 52.4 |
| r21 = 300.000 (DOE) | d21 = 4.50 | n12 = 1.72000 | v12 = 43.7 |
| r22 = −35.872 | d22 = 0.20 | | |
| r23 = −32.782 | d23 = 1.10 | n13 = 1.84666 | v13 = 23.9 |
| r24 = −95.047 | d24 = 0.20 | | |
| r25 = 51.695 | d25 = 1.00 | n14 = 1.84666 | v14 = 23.9 |
| r26 = 22.492 | d26 = 0.59 | | |
| r27 = 24.543 | d27 = 9.20 | n15 = 1.49700 | v15 = 81.5 |
| r28 = −28.284 | d28 = 0.50 | | |
| r29 = −30.991 | d29 = 1.30 | n16 = 1.80610 | v16 = 40.9 |
| r30 = −60.141(Aspheric) | d30 = Variable | | |
| r31 = ∞ | | | |

| Focal Length | 17.70 | 28.34 | 34.50 |
|---|---|---|---|
| Variable Separation | | | |
| d7 | 18.95 | 4.87 | 1.12 |
| d12 | 0.73 | 6.09 | 8.56 |
| d19 | 7.84 | 2.48 | 0.01 |
| d30 | 0.00 | 11.07 | 17.84 |
| skinf | 39.47 | 39.47 | 39.47 |

Aspheric Coefficients

1st Surface

| b | c | d | e |
|---|---|---|---|
| 7.895496e−06 | −4.217743e−09 | 4.529298e−12 | 4.344869e−15 |
| | | | f |
| | | | −3.344735e−18 |

21th Surface (DOE)

| C1 | C2 | C3 |
|---|---|---|
| −2.57605e−4 | 2.77549e−7 | −3.32546e−9 |

-continued

30th Surface

| b | c | d | e |
|---|---|---|---|
| 1.405727e−05 | 3.449989e−08 | −3.21689e−10 | 3.997547e−12 |
| | | f | g |
| | | −1.93997e−14 | 3.685435e−17 |

NUMERICAL EXAMPLE 3

| f = 20.7~57.7 | FNo = 1: 3.9~5.9 | 2ω = 92.4°~41.1° | |
|---|---|---|---|
| r1 = 43.067 | d1 = 1.70 | n1 = 1.83481 | v1 = 42.7 |
| r2 = 16.671 | d2 = 8.87 | | |
| r3 = 332.174 | d3 = 1.40 | n2 = 1.77250 | v2 = 49.6 |
| r4 = 21.467(Aspheric) | d4 = 0.55 | | |
| r5 = 25.240 | d5 = 5.00 | n3 = 1.80518 | v3 = 25.4 |
| r6 = 122.392 | d6 = Variable | | |
| r7 = 37.280 | d7 = 1.10 | n4 = 1.84666 | v4 = 23.8 |
| r8 = 15.126 | d8 = 4.10 | n5 = 1.54814 | v5 = 45.8 |
| r9 = −116.750 | d9 = 0.14 | | |
| r10 = 22.389 | d10 = 3.20 | n6 = 1.69680 | v6 = 55.5 |
| r11 = −96.098 | d11 = Variable | | |
| r12 = (Stop) | d12 = 1.20 | | |
| r13 = −56.661 | d13 = 2.20 | n7 = 1.78472 | v7 = 25.7 |
| r14 = −14.925 | d14 = 1.00 | n8 = 1.77250 | v8 = 49.6 |
| r15 = 40.242 | d15 = Variable | | |
| r16 = −91.173 | d16 = 2.50 | n9 = 1.55963 | v9 = 61.2 |
| r17 = −18.943 | d17 = 0.15 | | |
| r18 = −68.014 | d18 = 2.30 | n10 = 1.65160 | v10 = 58.5 |
| r19 = −24.455 (DOE) | d19 = 1.80 | | |
| r20 = −18.553 | d20 = 1.20 | n11 = 1.84666 | v11 = 23.8 |
| r21 = −39.108(Aspheric) | d21 = Variable | | |
| r22 = ∞ | | | |

| Focal Length | 20.74 | 38.05 | 57.68 |
|---|---|---|---|
| Variable Separation | | | |
| d6 | 28.42 | 9.67 | 2.50 |
| d11 | 2.00 | 5.81 | 9.61 |
| d15 | 9.07 | 5.26 | 1.46 |
| d21 | 0.00 | 12.72 | 25.44 |
| skinf | 38.25 | 38.25 | 38.25 |

Aspheric Coefficients

4th Surface

| b | c | d | e |
|---|---|---|---|
| −1.613883e−05 | −3.556380e−08 | 6.036133e−11 | −3.980541e−13 |

19th Surface (DOE)

| C1 | C2 | C3 |
|---|---|---|
| −3.56038e−4 | −5.04486e−7 | −6.29482e−9 |

21th Surface

| b | c | d |
|---|---|---|
| 1.099837e−05 | 4.692114e−08 | 2.794084e−10 |

NUMERICAL EXAMPLE 4

| f = 20.7~57.7 | FNo = 1: 3.8~5.7 | 2ω = 92.4°~41.1° | |
|---|---|---|---|
| r1 = 41.332 | d1 = 1.70 | n1 = 1.83481 | v1 = 42.7 |
| r2 = 16.538 | d2 = 9.55 | | |
| r3 = 463.051 | d3 = 1.40 | n2 = 1.77250 | v2 = 49.6 |
| r4 = 21.807(Aspheric) | d4 = 0.49 | | |
| r5 = 25.998 | d5 = 4.80 | n3 = 1.80518 | v3 = 25.4 |
| r6 = 137.920 | d6 = Variable | | |
| r7 = 37.425 | d7 = 1.05 | n4 = 1.84666 | v4 = 23.8 |
| r8 = 15.384 | d8 = 4.00 | n5 = 1.54814 | v5 = 45.8 |
| r9 = −111.271 | d9 = 0.14 | | |
| r10 = 22.470 | d10 = 3.20 | n6 = 1.69680 | v6 = 55.5 |
| r11 = −101.349 | d11 = Variable | | |
| r12 = 0.000 (Stop) | d12 = 1.20 | | |
| r13 = −56.071 | d13 = 2.10 | n7 = 1.78472 | v7 = 25.7 |
| r14 = −15.355 | d14 = 1.00 | n8 = 1.77250 | v8 = 49.6 |
| r15 = 40.274 | d15 = Variable | | |
| r16 = −121.872 | d16 = 2.20 | n9 = 1.55963 | v9 = 61.2 |
| r17 = −18.990 | d17 = 0.15 | | |
| r18 = −56.398 | d18 = 1.10 | n10 = 1.65160 | v10 = 58.5 |
| r19 = −50.000 (DOE) | d19 = 1.60 | n11 = 1.65160 | v11 = 58.5 |
| r20 = −24.374 | d20 = 1.80 | | |
| r21 = −18.413 | d21 = 1.20 | n12 = 1.84666 | v12 = 23.8 |
| r22 = −37.615(Aspheric) | d22 = Variable | | |
| r23 = ∞ | | | |

| Focal Length | 20.74 | 38.05 | 57.68 |
|---|---|---|---|
| Variable Separation | | | |
| d6 | 28.48 | 9.71 | 2.51 |
| d11 | 2.00 | 5.81 | 9.61 |
| d15 | 9.30 | 5.49 | 1.69 |
| d22 | 0.00 | 12.72 | 25.44 |
| skinf | 38.25 | 38.25 | 38.25 |

Aspheric Coefficients

4th Surface

| b | c | d | e |
|---|---|---|---|
| −1.644116e−05 | −3.844649e−08 | 7.666912e−11 | −4.384211e−13 |

19th Surface (DOE)

| C1 | C2 | C3 |
|---|---|---|
| −3.72419e−4 | −3.19980e−7 | −7.13137e−9 |

22th Surface

| b | c | d |
|---|---|---|
| 1.099837e−05 | 4.692114e−08 | 2.794084e−10 |

TABLE 1

| | equations | Lower Limit | Upper Limit | Example 1 | Example 2 | Example 3 | Example 4 |
|---|---|---|---|---|---|---|---|
| 4 | f4DOE/ft | 15 | 1500 | 1471 | 56 | 24 | 23 |
| 5 | f1DOE/ft | −1500 | −15 | −69 | — | — | — |
| 6 | $|f1|/\sqrt{(fw \cdot ft)}$ | 0.7 | 1.1 | 0.98 | 0.99 | 0.72 | 0.72 |
| 7 | $f2/\sqrt{(fw \cdot ft)}$ | 0.6 | 1.4 | 1.33 | 1.33 | 0.65 | 0.65 |
| 8 | $|f3|/f2$ | 1.05 | 1.5 | 1.23 | 1.23 | 1.37 | 1.36 |

TABLE 1-continued

| equations | Lower Limit | Upper Limit | Example 1 | Example 2 | Example 3 | Example 4 |
|---|---|---|---|---|---|---|
| 9 f4/f2 | 1.05 | 2.5 | 1.13 | 1.13 | 2.34 | 2.34 |
| 10 skw/fw | 1.6 | 2.8 | 2.3 | 2.2 | 1.8 | 1.8 |
| 11 θ | −15 | 15 | 26.0 | | | |
| | | | 19.0 | 13.2 | 28.6 | 11.8 |
| 12 Maximum Limit of |dQ(h)/dh| | — | 30 | 14.5 | | | |
| | | | 4.9 | 18.2 | 12.2 | 11.8 |

Thus, the present embodiment may provide a zoom lens system and optical apparatus using the same, which properly arranges a lens in each lens unit and a diffraction optical surface in the lens unit, thereby facilitating a high range zooming ratio, satisfactorily correcting transverse chromatic aberration that fluctuates with zooming, and exhibiting good optical performance throughout the entire zoom range.

The present embodiment may also provide a compact zoom lens system having a focal length with about 28 mm when converted into a focal length for a 35 mm single-lens reflex camera, and an optical apparatus using the same, which have good optical performance, in particular in corrected transverse chromatic aberration.

What is claimed is:

1. A zoom lens system comprising, in order from an object side:

a first lens unit of negative refractive power, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T D2W<D2T, and D3W>D3T are satisfied where DiW is a separation between i-th and (i+1)-th lens units at a wide-anile end, DiT is a separation between the i-th and (i+1)-th lens units at a telephoto end, and wherein a diffraction optical element is included in the fourth lens unit, and a conditional expression $15 < f4DOE/ft < 1500$ is satisfied where f4DOE is a focal length of only a diffraction component of the diffraction optical element, and ft is a focal length of an entire lens system at the telephoto end.

2. A zoom lens system comprising, in order from an object side:

a first lens unit of negative refractive power, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end, DiT is a separation between the i-th and (i+1)-th lens units at a telephoto end, and wherein a diffraction optical element is included in the first lens unit, and a conditional expression $-1500 < f1DOE/ft < -15$ is satisfied where f1DOE is a focal length of only a diffraction component of the diffraction optical element and ft is a focal length of an entire lens system at the telephoto end.

3. A zoom lens system comprising, in order from an object side:

a first lens unit of negative refractive power, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end DiT is a separation between the i-th and (i+1)-th lens units at a telephoto end, wherein a diffraction optical element is included in at least one of said lens units, and wherein conditional expressions $0.7 < |f1|/\sqrt{(fw \cdot ft)} < 1.1$, $0.6 < f2/\sqrt{(fw \cdot ft)} < 1.4$, $1.05 < |f3|/f2 < 1.5$, and $1.05 < f4/f2 < 2.5$ are satisfied where fw and ft are focal lengths of an entire lens system at the wide-angle and telephoto ends, respectively, and fi is a focal length of the i-th lens unit.

4. A zoom lens system comprising, in order from an object side:

a first lens unit of negative refractive power, wherein said first lens unit has such an aspheric surface that negative refractive power of the aspheric surface decreases from a center of the lens to a peripheral of the lens, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end, DiT is a separation between the i-th and (i+1)-th lens units at a telephoto end, wherein a diffraction optical element is included in at least one of said lens units.

5. A zoom lens system comprising, in order from an object side:

a first lens unit of negative refractive power, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end, DiT is a separation between the i-th and (i+1)-th lens units at a telephoto end, wherein a diffraction optical element is included in at least one of said lens units, and wherein a conditional expression $-30<\theta<30$ is satisfied where $\theta$ is an angle between a ray incident to and emitted from said diffraction optical element and a plane normal of said diffraction optical element.

6. A zoom lens system according to claim 5, wherein a conditional expression $1.6<SKw/fw<2.8$ is satisfied where fw is a focal length of an entire lens system at the wide-angle end, and SKw is a back focal distance at the wide-angle end.

7. A zoom lens system according to claim 5, wherein the second and fourth lens units move together as one member during zooming.

8. A zoom lens system according to claim 5, wherein said first lens unit moves while drawing a convex locus at a side of an image surface during zooming.

9. A zoom lens system according to claim 5, further comprising a stop adjacent to said third lens unit at the object side or an image side.

10. A zoom lens system according to claim 5, wherein a conditional expression $-15<\theta<15$ is satisfied where $\theta$ is an angle between a ray incident to and emitted from said diffraction optical element and a plane normal of said diffraction optical element.

11. A zoom lens system according to claim 5, wherein the diffraction optical element has a layered structure.

12. A zoom lens system comprising, in order from an object side:

a first lens unit of negative refractive power, a second lens unit of positive refractive power, a third lens unit of negative refractive power, and a fourth lens unit of positive refractive power, wherein said fourth lens unit has such an aspheric surface that positive refractive power of the aspheric surface decreases from a center of the lens to a peripheral of the lens, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end, DiT is a separation between the i-th and (i+1)-th lens units at a telephoto end, wherein a diffraction optical element is included in at least one of said lens units.

13. A zoom lens system comprising, in order from an object side:

a first lens unit of negative refractive power, a second lens unit of positive refractive power, a third lens unit of negative refractive power, and a fourth lens unit of positive refractive power, wherein said zoom lens system zooming from a wide-angle end to a telephoto end while varying a separation between each lens units so that conditional expressions D1W>D1T, D2W<D2T, and D3W>D3T are satisfied where DiW is a separation between i-th and (i+1)-th lens units at a wide-angle end, DiT is a separation between the i-th and (i+1)-th lens units at a telephoto end, wherein a diffraction optical element is included in at least one of said lens units, and wherein a conditional expression $|dQ(h)/dh|<30$ is satisfied where Ci is a phase coefficient, h is a height from a center of an optical axis, $\lambda_o$ is a reference wave length, and $Q(h)=(C1 \cdot h^2+C2 \cdot h^4+C3 \cdot h^6+ \ldots)/\lambda_o$.

14. An optical apparatus comprising a zoom lens system comprising, in order from an object side, a first lens unit of negative refractive power, a second lens unit of positive refractive power, a third lens unit of negative refractive power, and a fourth lens unit of positive refractive power, wherein said zoom lens system zooming from a wide angle end to a telephoto end a separation between each lens units is varied so that conditional expressions D1W>D1T, D2W<D2T, and D3W>D3T are satisfied where DiW is a separation between an i-th lens unit and an (i+1)-th lens unit at a wide-angle end, DiT is a separation between an i-th lens unit and an (i+1)-th lens unit at a telephoto end, wherein a diffraction optical element is included in at least one of lens units, and wherein a conditional expression $-30<\theta<30$ is satisfied where $\theta$ is an angle between a ray incident to and emitted from said diffraction optical element and a plane normal of said diffraction optical element.

* * * * *

UNITED STATES PATENT AND TRADEMARK OFFICE
CERTIFICATE OF CORRECTION

PATENT NO. : 6,639,721 B2
DATED : October 28, 2003
INVENTOR(S) : Hiroshi Endo

It is certified that error appears in the above-identified patent and that said Letters Patent is hereby corrected as shown below:

Column 5,
Line 6, delete "DIW" and insert therefor -- DiW --

Column 15,
Line 35, delete "D1T" and insert therefore -- D1T, --
Line 37, delete "wide-anile" and insert therefor -- wide-angle --

Column 16,
Line 28, delete "end" and insert therefor -- end, --

Signed and Sealed this

Twenty-eighth Day of June, 2005

JON W. DUDAS
*Director of the United States Patent and Trademark Office*